United States Patent
Longoni et al.

US 6,493,564 B2
Dec. 10, 2002

(54) POWER CONTROL METHOD AND SYSTEM IN MOBILE COMMUNICATION NETWORKS

(75) Inventors: Fabio Longoni, Espoo (FI); Oscar Salonaho, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/876,462

(22) Filed: Jun. 7, 2001

(65) Prior Publication Data

US 2002/0019245 A1 Feb. 14, 2002

Related U.S. Application Data

(63) Continuation of application No. PCT/EP98/07931, filed on Dec. 7, 1998.

(51) Int. Cl.[7] .................................................. H04B 7/00
(52) U.S. Cl. ......................... 455/522; 455/561; 455/70
(58) Field of Search ........................... 455/522, 69, 70, 455/507, 517, 67.1, 572, 574, 127, 561; 370/318

(56) References Cited

U.S. PATENT DOCUMENTS

| | | |
|---|---|---|
| 5,604,730 A | 2/1997 | Tiedemann, Jr |
| 6,181,738 B1 * | 1/2001 | Chheda et al. ............ 455/522 |

FOREIGN PATENT DOCUMENTS

| | | |
|---|---|---|
| WO | WO 95/07012 | 3/1995 |
| WO | WO 97/34439 | 9/1997 |
| WO | WO 98/02981 | 1/1998 |
| WO | WO 98/11677 | 3/1998 |

* cited by examiner

*Primary Examiner*—Doris H. To
(74) *Attorney, Agent, or Firm*—Altera Law Group, LLC

(57) ABSTRACT

A method and system for performing power control in a mobile communication network comprising at least one base station and a network element connected to the base station, wherein a reliability information is transmitted from the at least one base station to the network element, the reliability information defining a quality of a radio transmission between the at least one base station and a mobile terminal. Based on the transmitted reliability information, the network element determines a variation of a target setpoint for power control and transmits a power control command defining the variation of the target setpoint to the at least one base station. Thereby, a bearer specific controlling procedure can be performed and the signaling of the procedure can be done via the user plane. This implementation provides an outer loop power control having the necessary flexibility to adapt its parameters to the bearer characteristic of an actual connection.

35 Claims, 2 Drawing Sheets

POWER CONTROL METHOD AND SYSTEM IN MOBILE COMMUNICATION NETWORKS

This application is a continuation of PCT/EP98/07931 filed on Dec. 7, 1998.

FIELD OF THE INVENTION

The present invention relates to a method and system for performing power control in a mobile communication network such as a radio access network of a WCDMA (Wideband Code Division Multiple Access) system like the UMTS (Universal Mobile Telecommunications System).

BACKGROUND OF THE INVENTION

In a mobile radio network, the transmitting power of a mobile station is adjusted by a closed loop power control in order to keep the received uplink Signal-to-Interference Ratio (SIR) at a given SIR target. Therefore, a base station controlling the mobile station performs an estimation of the total uplink received interference in the current frequency band. Based on the estimation, the base station generates power control commands which are transmitted to the mobile station.

Upon reception of a power control command, the mobile station adjusts the transmit power in a given direction with a predetermined step. The step size is a parameter which may differ between different radio cells.

Additionally, an outer loop power control is performed in order to adjust the SIR target used by the closed loop power control. The SIR target is independently adjusted for each connection based on an estimated quality of the connection In addition, the power offset between uplink channels may be adjusted. The quality estimate is derived based on different service combinations. Typically, a combination of an estimated bit-error rate and frame-error rate is used.

In a radio access network of a WCDMA system, packet- and circuit-switched services can be freely mixed, with variable bandwidths, and delivered simultaneously to the same user, with specific quality levels. Moreover, bandwidths requirements for a user can be changed during a session. Therefore, a flexible power control is required in such a radio access network of the WCDMA system.

SUMMARY OF THE INVENTION

It is therefore an object of the present invention to provide a method and system for performing a flexible power control.

This object is achieved by a method for performing power control in a mobile communication network, comprising the steps of:
- transmitting a reliability information from at least one base station to a network element of the mobile communication network, said reliability information defining a quality of a radio transmission between the at least one base station and a mobile terminal or vice versa;
- determining a variation of a target setpoint for power control, based on the transmitted reliability information;
- transmitting a power control command defining the variation of the target setpoint from the network element to the at least one base station.

Additionally, the above object is achieved by a system for performing power control in a mobile communication network comprising a base station and a network element connected to the base station,
- wherein the base station comprises generating means for generating a reliability information defining a quality of a radio transmission between the base station and a mobile terminal or vice versa, and a transmitting means for transmitting the reliability information to the network element; and
- wherein the network element comprises a receiving means for receiving the reliability information, a determination means for determining a variation of a target setpoint for power control, based on the received reliability information, a generating means for generating a power control command defining a variation of the target setpoint, and a transmitting means for transmitting the power control command to the base station.

Accordingly, the outer loop power control is performed in a network element using a reliability information set by the base station such that a bearer specific controlling procedure can be performed, wherein the signaling of the procedure can be done via the user plane. Thereby, an outer loop power control with the necessary flexibility can be implemented so as to adapt the power control parameters to the bearer characteristics such as bit rate, required quality, bit error rate, coding and interleaving, and the like.

The power control may be performed on the basis of a reliability information transmitted from a plurality of base stations connected to the network element, wherein the variation of the target setpoint for power control is performed on the basis of a consideration of each respective reliability information transmitted from the plurality of base stations to the network element, and wherein the power control command is transmitted to each of the plurality of base stations. Thereby, the improved power control also can be performed in soft handover cases, where two or more base stations simultaneously communicate with one mobile terminal.

The determination of the variation of the target setpoint for power control can be performed on the basis of a selection of the best reliability information or, alternatively, on the basis of a predetermined combination of the received reliability informations.

The target setpoint may be a target energy per bit to noise power density ratio.

Preferably, the network element is a radio network controller in which the required parameters of the bearer characteristics are available.

The reliability information may be inserted as a control information into an uplink data packet such as a packet data unit (PDU) of the User Plane Transport Protocol (UPTP) The format and/or coding of the control information may be bearer dependent. Thereby, the overhead of the PDUs can be adapted to the bearer and thus minimized. Preferably, the format and/or coding of the control information is defined in a channel setup phase.

The reliability information may comprise a result of a redundancy code check performed by the base station, and/or a channel specific parameter In case different uplink branches are combined, one resulting reliability information is defined. Thereby, an improved power control also can be performed in softer handover cases, where a plurality of radio cells belonging to the same base station are involved in the communication with the mobile terminal.

The power control command generated in the network element may be inserted as a control information into a downlink data packet which may also be a PDU of the UPTP. In case a power control command is required while no downlink data packet is being transmitted, an empty downlink data packet containing only the power control command may be transmitted.

The coding of the power control command may be bearer dependent to thereby minimized the overhead of the downlink data packets. In particular, the coding of the power control command may be defined in a channel setup phase.

Preferably, the power control command defines a variation of the energy per bit to noise power density ratio Eb/No. In particular, the power control command may have a length of one bit so as to define an incrementation or decrementation of the Eb/No. Alternatively, the power control command may have a length of a plurality of bits so as to define a change value of the Eb/No.

In case a downlink data splitting is performed in a network element, the power control command may be duplicated in all branches.

If a dedicated channel activity is performed, an absolute value of the target setpoint may be set by the base station in all branches. in this case, a step size for the variation of the target setpoint may be redefined during the dedicated channel activity using a layer 3 signaling.

The base station may comprise a checking means for checking a redundancy code received from the mobile station, wherein a generating means of the base station generates the reliability information on the basis of the checking result of the checking means and/or a channel decoder specific parameter.

Furthermore, the base station may comprise a target setting means for changing the target setpoint for power control in accordance with the variation defined by the received power control command. The target setting means may be controllable so as to set an absolute value of the target setpoint. Moreover, the target setting means may be controllable so as to redefine a step size for the variation of the target setpoint, based on a layer 3 signaling.

The determination means of the network element may be arranged to determine the variation of the target setpoint for power control on the basis of each reliability information received from a plurality of base stations, wherein the power control command is transmitted by the transmitting means of said network element to each of the plurality of base stations. In this case, the determination means can be arranged to determine the variation of the target setpoint for power control on the basis of a selection of the worst reliability information received from the plurality of base stations, or on the basis of a predetermined combination of the received reliability information.

Moreover, the generating means of the at least one base station may be arranged to determine a resultant reliability information on the basis of a plurality of reliability informations generated for a plurality of uplink branches. In this case, the generating means of the at least one base station may be arranged to determine the resultant reliability information on the basis of the worst reliability information of the plurality of uplink branches, or on the basis of a predetermined combination of the generated reliability informations.

BRIEF DESCRIPTION OF THE DRAWINGS

In the following, the present invention will be described in greater detail on the basis of a preferred embodiment with reference to the accompanying drawings in which.

DESCRIPTION OF THE PREFERRED EMBODIMENT

In the following, the preferred embodiment of the method and system according to the present invention will be described on the basis of a radio access network of a WCDMA system such as the UMTS.

In such a radio access network, a mobile station (MS) is radio-connected to at least one base station (BS) which is connected to a radio network controller (RNC). In WCDMA based systems, the MS can be connected to several BS simultaneously due to macrodiversity.

Figure 1:
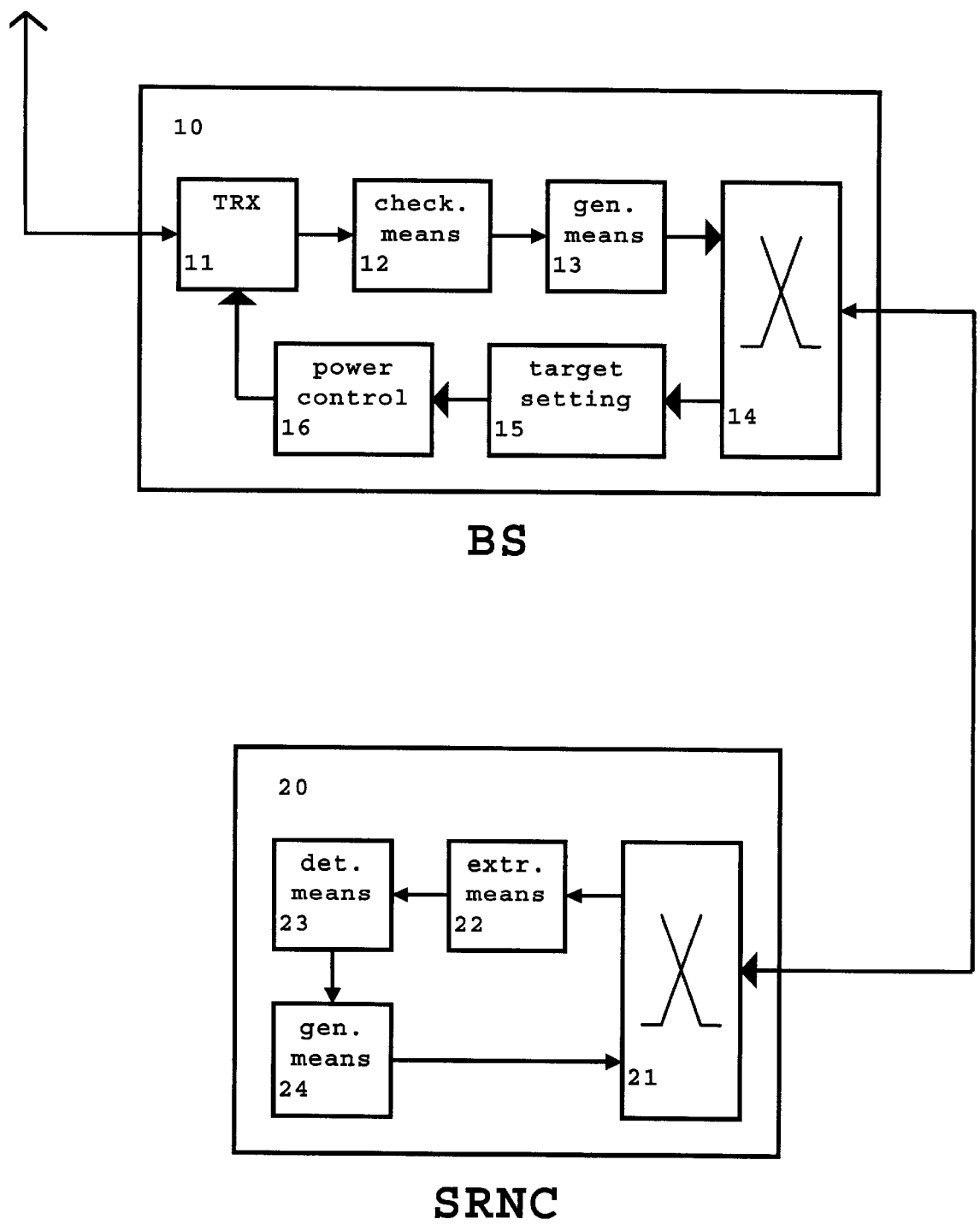
FIG. 1 shows a diagram indicating information processings and flows in a base station or a serving radio network controller, or between the base station and the serving radio network controller, respectively, of a power control system according to the preferred embodiment of the present invention.

FIG. 1 shows a BS 10 connected to a serving RNC (SRNC) 20 which serves the radio cell in which a MS controlled by the BS 10 is currently located. The BS 10 comprises a transceiver 11 for performing a radio communication with the controlled MS. Furthermore, the BS 10 comprises a switching means such as an ATM switch 14 arranged to connect a receiving path and a transmitting path of the BS 10 with a switching means such as an ATM switch 21 of the SRNC 20.

Moreover, the BS 10 comprises a power control means 16 which performs the closed loop power control in order to adjust the transmission power of the MS on the basis of a setting command supplied from a target setting means 15.

Figure 2:
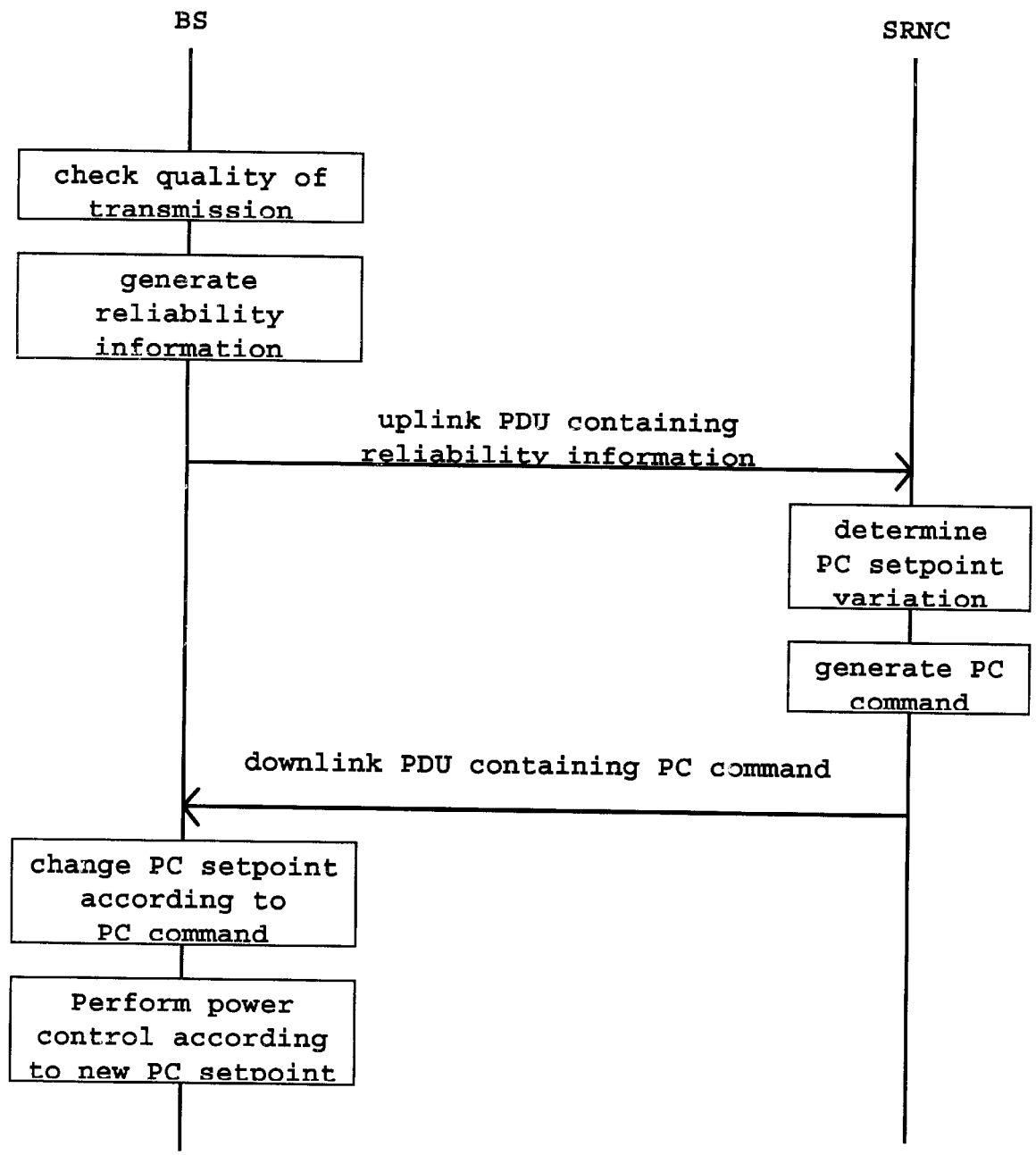
FIG. 2 shows a principle block diagram of a power control system according to the preferred embodiment of the present invention.

The detailed function of the power control system according to the preferred embodiment is described in the following on the basis of the diagram shown in FIG. 2. According to FIG. 2, information processing and transmission in and between the BS 10 and the SRNC 20 is shown, wherein the processing flow starts at the top of FIG. 2 and proceeds to the bottom thereof.

Initially, the transmission quality of the radio transmission between the controlled MS and the BS 10 is checked on the basis of an energy per bit to noise power density ratio Eb/No which is a statement of the general transmission condition independent of the actual received power, the bit rate frequency, and the noise figure of the receiver The relation between the sampled signal to noise power ratio $[S/N]_s$ and Eb/No depends on the pulse wave form and the receiving filter characteristics. It should be noted that any other parameter for determining the quality of transmission can be used in the present power control system.

The above described checking procedure is performed in a checking means 12 of the BS 10. Based on the checked quality of transmission, a generating means 13 of the BS 10 generates a reliability information indicating the transmission quality. The reliability information is supplied to the ATM switch 14 which inserts the reliability information as a control information into an uplink packet data unit (PDU) of the User Plane Transport Protocol (UPTP), and transmits the uplink PDU to the SRNC 20.

The ATM switch 21 of the SRNC 20 receives the uplink PDU and supplies it to an extracting means 22 which is arranged to extract the reliability information from the received uplink PDU.

The extracted reliability information is supplied to a determination means 23 which determines a power control setpoint variation based on the supplied reliability information and under consideration of the corresponding bearer characteristic. Thereby, the Eb/No setpoint is adapted to the bearer characteristics of the current connection.

Based on the determined setpoint variation, a generating means 24 generates a power control command (PC command) defining the setpoint variation. Subsequently the PC command is supplied to the ATM switch 21 which inserts the PC command as a control information into a downlink PDU of the UPTP, and transmits the downlink PDU to the ATM switch 14 of the BS 10.

In the BS 10, the ATM switch 14 extracts the PC command from the downlink PDU and supplies it to the target setting means 15. Based on the received PC command the target setting means 15 generates a power setting command and supplies it to the power control means 16, such that the power control setpoint is changed according to the received PC command. Subsequently. the power control means 16 performs a closed loop power control on the basis of the new power control setpoint, i e. Eb/No setpoint.

According to the above description of the preferred embodiment, the outer loop power control algorithm is located in the SRNC 20, and, based on the reliability information set by the BS 10 and included in the uplink user data, a variation of the target Eb/No setpoint is commanded, which is to be used by the fast uplink power control loop in the air interphase. The variation, i e. the PC command, is signaled to the BS 10.

The format and/or coding of the reliability information in the uplink PDU is generated based on the corresponding bearer and is defined in the channel setup phase. It can be composed e.g. of the results of a Cyclic Redundancy Code (CRC) check performed by the checking means 12 of the BS 10 on groups of bit, and/or by some channel specific parameters such as a channel decoder specific parameter or the like.

If two or more BSs 10 communicate with one MS, e.g. in soft handover cases, the SRNC 20 receives two or more reliability informations in the respective uplink PDUS. In this case, a resultant reliability information is determined by the determination means 23 of the SRNC 20 on the basis of a predetermined combination such as an average of the received reliability informations or a selection of one of the received reliability informations, e.g. the best reliability information. Then, the power control command is duplicated or multiplied and inserted into the respective downlink PDUs transmitted to the two or more BSs 10 which communicate with the MS.

Also in case different uplink branches are combined in one BS 10, e.g. in softer handover cases, only one resultant reliability information is defined in the generating means 13 of the BS 10, which may be obtained e.g. on the basis of the best reliability information of the uplink branches or on the basis of a predetermined combination of the received reliability informations, or which can be generated based on the combined signal from the sectors.

If the determination means 23 of the SRNC 20 determines the requirement of a variation of the power control setpoint and no downlink PDU is being transmitted at present, the ATM switch 21 generates an empty PDU which includes only the PC command supplied from the generating means 24 and no user data. This may occur for example either when there is no data activity in the downlink direction, or when the transmission rate of the downlink PDU is slower than the PC command rate.

The coding of the PC command generated in the generating means 24 is bearer specific and is defined in the channel setup phase from dedicated channel parameters stored in the SRNC 20. The PC command can be a simple bit which defines a predetermined upward or downward step, i.e. an incrementation or decrementation of the Eb/No setpoint. Alternatively, the PC command can be a number of bits defining with more accuracy the entity of the variation, i.e. the magnitude of the variation of the Eb/No setpoint, including no variation at all.

In case a downlink data splitting is performed in a Mediation Device Communicator (MDC) unit of the communication network, the same power control command is duplicated in all branches.

During a dedicated channel activity, the target setting means 15 of the BS 10 can be controlled by a layer 3 (L3) signaling to set an absolute value of the Eb/No setpoint in all branches, to thereby avoid drifts in the Eb/No setpoint values of different branches, which may be caused by handovers. Furthermore, the target setting means 15 can be controlled using a L3 signaling so as to redefine a step size for the Eb/No setpoint variation.

Thus, an outer loop power control is provided having the necessary flexibility to adapt its parameters, i.e. reliability information, PC command, step size, rate of PC command, to the bearer characteristics, i.e. bit rate required quality, bit error rate, coding and interleaving and so on.

It is to be pointed out that the power control method and system described in the preferred embodiment can be applied to any mobile radio network comprising a base station connected to a network element. The above description of the preferred embodiment and the accompanying drawings are only intended to illustrate the present invention. The preferred embodiment of the invention may thus vary within the scope of the attached claims.

In summary, a method and system for performing power control in a mobile communication network is described, comprising base stations and a network element connected to the base stations, wherein a reliability information is transmitted from at least one base station to the network element, the reliability information defining a quality of a respective radio transmission between the at least one base station and a mobile terminal or vice versa. Based on the transmitted reliability information, the network element determines a variation of a target setpoint for power control and transmits a power control command defining the variation of the target setpoint to the at least one base station. Thereby, a bearer specific controlling procedure can be performed and the signaling of the procedure can be done via the user plane. This implementation provides an outer loop power control having the necessary flexibility to adapt its parameters to the bearer characteristics of an actual connection.

What is claimed is:

1. A method for performing power control in a mobile communication network, comprising the steps of:
   a) transmitting a reliability information from at least one base station to a network element of said mobile communication network, said reliability information defining a quality of a radio transmission between said at least one base station and a mobile terminal or vice versa;
   b) determining a variation of a target setpoint for power control, based on the transmitted reliability information;
   c) transmitting a power control command defining said variation of said target setpoint from said network element to said at least one base station,
   wherein said target setpoint is a target energy per bit to noise power density ratio Eb/No, and
   wherein format and/or coding of the power control information is defined in a channel setup phase.

2. A method according to claim 1, wherein said reliability information is transmitted by a plurality of base stations connected to said network element, wherein said variation of said target setpoint for power control is performed on the basis of a combined consideration of each reliability information transmitted from said plurality of base stations to said network element, and wherein said power control command is transmitted to each of said plurality of base stations.

3. A method according to claim 2, wherein said determination of said variation of the target setpoint for power control is performed on the basis of a selection of the best reliability information.

4. A method according to claim 2, wherein said determination of said variation of the target setpoint for power control is performed on the basis of a predetermined combination of the received reliability information.

5. A method according to claim 1, wherein said network element is a radio network controller.

6. A method according to claim 1, wherein said reliability information is inserted as a control information into an uplink data packet.

7. A method according to claim 1, wherein said format and/or coding of said control information is bearer dependent.

8. A method according to claim 1, wherein said reliability information comprises a result of a redundancy code check performed by said base station, and/or a channel decoder specific parameter.

9. A method according to claim 1, wherein one resulting reliability information is defined, when different uplink branches are combined.

10. A method according to claim 1, wherein said power control command is inserted as a control information into a downlink data packet.

11. A method according to claim 10, wherein an empty downlink data packet containing only said power control command is transmitted, when said power control command is required while no downlink data packet is being transmitted.

12. A method according to claim 1, wherein a coding of said power control command is bearer dependent.

13. A method according to claim 1, wherein said coding of said power control command is defined in a channel setup phase.

14. A method according to claim 1, wherein said power control command defines a variation of the energy per bit to noise power density ratio Eb/No.

15. A method according to claim 14, wherein said power control command has a length of one bit and defines an incrementation or decrementation of the Eb/No.

16. A method according to claim 14, wherein said power control command has a length of a plurality of bits and defines a change value of the Eb/No.

17. A method according to claim 1, wherein said power control command is duplicated in all branches, when a downlink data splitting is performed in a network element.

18. A method according to claim 1, wherein an absolute value of said target setpoint can be set in all branches during a dedicated channel activity.

19. A method according to claim 18, wherein a step size for the variation of said target setpoint can be redefined during said dedicated channel activity using a layer 3 signaling.

20. A system for performing power control in a mobile communication network comprising at least one base station and a network element connected to said at least one base station, wherein said at least one base station comprises:
    a generating means for generating a reliability information defining a quality of a radio transmission between said base station and a mobile terminal; and
    a transmitting means for transmitting said reliability information to said network element; and wherein said network element comprises:
        a receiving means for receiving said reliability information;
        a determination means for determining a variation of a target setpoint for power control based on the received reliability information;
        a generating means for generating a power control command defining said variation of said target setpoint; and
        a transmitting means for transmitting said power control command to said at least one base station, wherein said target setpoint is a target energy per bit to noise power density ratio Eb/No, and
        wherein format and/or coding of the power control information is defined in a channel setup phase.

21. The system according to claim 20, wherein said transmitting means of said at least one base station is arranged to insert said reliability information as a control information into an uplink data packet.

22. The system according to claim 20, wherein said at least one base station further comprises a checking means for checking a redundancy code received from said mobile terminal, and wherein said generating means of said base station generates said reliability information on the basis of the checking result of said checking means and/or a channel specific parameter.

23. The system according to claim 20, wherein said transmitting means of said network element is arranged to insert said power control command as a control information into a downlink data packet.

24. The system according to claim 23, wherein said transmitting means of said network element is arranged to generate an empty downlink packet containing only said power control command, when said power control command is required while no downlink data packet is being transmitted.

25. The system according to claim 20, wherein said at least one base station further comprises a target setting means for changing the target setpoint for power control in accordance with the variation defined by the received power control command.

26. The system according to claim 25, wherein said target setting means can be controlled based on a layer 3 signaling so as to set an absolute value of said target setpoint.

27. The system according to claim 23, wherein said target setting means can be controlled based on a layer 3 signaling so as to redefine a step size for the variation of said target setpoint.

28. The system according to claim 20, wherein said determination means of said network element is arranged to determine said variation of said target setpoint for power control on the basis of each reliability information received from a plurality of base stations, and wherein said power control command is transmitted by said transmitting means of said network element to each of said plurality of base stations.

29. The system according to claim 28, wherein said determination means is arranged to determine said variation of said target setpoint for power control on the basis of a selection of the best reliability information received from said plurality of base stations.

30. The method according to claim 28, wherein said determination means is arranged to determine said variation of said target setpoint for power control on the basis of a predetermined combination of the received reliability information.

31. The system according to claim 20, wherein said generating means of said at least one base station is arranged to determine a resultant reliability information on the basis of a plurality of reliability informations generated for a plurality of uplink branches.

32. The system according to claim 31, wherein said generating means of said at least one base station is arranged to determine said resultant reliability information on the basis of the worst reliability information of said plurality of uplink branches or on the basis of a pre-determined combination of said generated reliability informations.

33. The system according to claim 20, wherein said network element is a radio network controller.

34. A network element for use in a system according to claim 20.

35. A base station for use in a system according to claim 20.

* * * * *